United States Patent [19]

Iwasa et al.

[11] Patent Number: 5,747,897
[45] Date of Patent: May 5, 1998

[54] STEPPING MOTOR HAVING IMPROVED CONSTRUCTION TO REDUCE PARTS AND FACILITATE MANUFACTURE

[75] Inventors: Toru Iwasa; Akio Ito; Yoshiyuki Ariki, all of Saitama, Japan

[73] Assignee: Jeco Co., Ltd., Japan

[21] Appl. No.: 768,429

[22] Filed: Dec. 18, 1996

[30] Foreign Application Priority Data

Dec. 28, 1995 [JP] Japan .................... 7-343392

[51] Int. Cl.$^6$ .................... H02K 37/00; H02K 15/00
[52] U.S. Cl. .................... 310/49 R; 310/42; 310/179; 310/180; 310/194; 310/259
[58] Field of Search .................... 310/49 R, 164, 310/179, 180, 194, 259, 42, 254

[56] References Cited

U.S. PATENT DOCUMENTS

| | | | |
|---|---|---|---|
| 4,127,802 | 11/1978 | Johnson | 318/696 |
| 4,471,246 | 9/1984 | Paillet | 310/42 |
| 4,884,333 | 12/1989 | Cooper et al. | 29/596 |
| 5,121,017 | 6/1992 | Yamamoto et al. | 310/49 R |
| 5,187,400 | 2/1993 | Kurata | 310/49 R |

FOREIGN PATENT DOCUMENTS 61-121764  6/1986  Japan .

Primary Examiner—Steven L. Stephan
Assistant Examiner—Tran N. Nguyen
Attorney, Agent, or Firm—Blakely Sokoloff Taylor & Zafman

[57] ABSTRACT

In a stepping motor, each of four integrally molded annular stators constituting two pairs has an annular plate having a central hole in which a magnet rotor is to be inserted, and pole teeth that form magnetic pole portions separated from the magnet rotor at a predetermined gap. The pole teeth of one annular stator of a given pair extend from the annular plate to be perpendicular to the other of the given pair, and are equidistantly arranged around the central hole to be shifted from the pole teeth of the other annular stator by a half pitch. Mounting holes are formed in each annular plate at predetermined spaces in the circumferential direction, and the mounting holes formed in the annular plates of given annular stators of different pairs that are arranged back to back are located at the same positions. Molded insulating films are formed on surfaces, which do not oppose the magnet rotor, of all the annular stators. The insulating films are coupled to each other through the mounting holes formed in the annular plates of the given annular stators. Excitation coils are wound on all the annular stators through the insulating films. A plate-like yoke has a major portion inserted between opposing surfaces of the annular plates adjacent to the outer circumferential surfaces of all the annular stators.

9 Claims, 10 Drawing Sheets 5,747,897

STEPPING MOTOR HAVING IMPROVED CONSTRUCTION TO REDUCE PARTS AND FACILITATE MANUFACTURE

BACKGROUND OF THE INVENTION

The present invention relates to a stepping motor using a permanent magnet and, more particularly to a stepping motor used as a drive motor for a clock using a quartz oscillator, a drive motor for an EGR (Exhaust Gas Recirculating) valve, a geared motor, or the like.

In recent years, so-called quartz clocks using quartz oscillators are widely used, and in a quartz clock installed in a station or on a high wall surface and thus cannot be reached at, time is corrected quickly and accurately by remote control. As a motor which is applied to such a remote-controllable quartz clock, a stepping motor of the two-phase excitation scheme is known which can be rotated forward and backward by controlling the phase of a signal supplied to the excitation coil.

FIGS. 10 to 13 show a conventional stepping motor of the two-phase excitation scheme, in which FIG. 10 shows a stepping motor for a clock, FIG. 11 shows a magnet rotor and rotor assemblies, and FIGS. 12 and 13 show excitation patterns.

Referring to FIG. 10, a magnet rotor 1, upper and lower stator assemblies 2 and 3, a minute hand shaft 33, a hour hand shaft 36, a gear transmission mechanism 23, and the like are accommodated in a clock case 20 constituted by an upper case 21 and a lower case 22. The magnet rotor 1 is rotatably, axially supported by bearing projections 24 and 25 integrally formed with the upper and lower cases 21 and 22, respectively. Rotation of the magnet rotor 1 is transmitted to a gear 30 through a gear 26 integrally disposed at the upper portion of the magnet rotor 1. Rotation of this gear 30 is transmitted to the minute hand shaft 33 through the gear 30, a rotary gear 30a, a gear 31, a gear 31a, and a gear 32, and to the hour hand shaft 36 through the gear 30, the gear 30a, the gear 31, the gear 31a, the gear 32, the gear 32a, a gear 34, a gear 34a, and a gear 35. The hour hand shaft 36 integrally has the gear 35 and is rotatably fitted on the minute hand shaft 33.

The stepping motor used in this case is constituted by the magnet rotor 1 and the upper and lower stator assemblies 2 and 3 that perform two-phase excitation. An intermediate plate 16 made of a nonmagnetic material is interposed between the upper and lower stator assemblies 2 and 3 to prevent magnetic interference between them. The outer circumferential surface of the magnet rotor 1 is magnetized to have three pairs of (a total of six) magnetic poles N1, N2, N3, S1, S2, and S3 alternately and equidistantly in the circumferential direction.

Of the pair of upper and lower stator assemblies 2 and 3, the upper stator assembly 2 is constituted by a pair of stators 4 and 5, and an excitation coil 6 for exciting the stators 4 and 5. The pair of stators 4 and 5 form a U shape to be axially symmetrical when seen from the above, and are arranged such that their end portions oppose each other in a plane perpendicular to the axis of the magnet rotor 1. One end portion of the stator 4 and one end portion of the stator 5 oppose each other through the magnet rotor 1 to constitute stator magnetic pole portions 7 and 8, and the other end portion 9 of the stator 4 and the other end portion 10 of the stator 5 are inserted in a bobbin 40 which is made of a nonmagnetic material, e.g., a synthetic resin, and on which the excitation coil 6 is wound. The pair of stators 4 and 5 form a magnetic circuit through the magnet rotor 1. The opposing surfaces of the stator magnetic pole portions 7 and 8 are formed into semicircular concave surfaces extending in a range of about 180° so that they oppose the outer circumferential surface of the magnet rotor 1 through an appropriate air gap G.

Similarly, as in the upper stator assembly 2, the lower stator assembly 3 has a pair of stators 11 and 12 and an excitation coil 13. The end portions of the stators 11 and 12 that oppose each other through the magnet rotor 1 form stator magnetic pole portions 14 and 15, respectively. Terminals 42 are formed at the bobbin 40 on which the excitation coil 6 is wound, and to a bobbin 40 on which the excitation coil 13 is wound, and an excitation current is supplied to the excitation coils 6 and 13 through these terminals 42. The pair of upper and lower stator assemblies 2 and 3 are mounted such that they are 180° out of phase from each other in the circumferential direction of the magnet rotor 1. As the upper and lower stator assemblies 2 and 3 have the same structure in this manner, the excitation coils 6 and 13 are arranged to be located on the opposite sides of the magnet rotor 1.

In this structure, when the excitation coils 6 and 13 are energized to excite the stators 4, 5, 11, and 12 by two-phase excitation, four excitation patterns, i.e., (N, S, N, S), (N, S, S, N), (S, N, S, N), and (S, N, N, S) can be obtained. When these excitation patterns are continuously changed in this order at a predetermined speed, the magnet rotor 1 rotates in a predetermined direction at a predetermined speed due to the magnetic operation among the magnet rotor 1 and the stators 4, 5, 11, and 12. Rotation of the magnet rotor 1 is reduced and transmitted to the minute hand shaft 33 and the hour hand shaft 36 through the gear transmission mechanism 23 to rotate the minute hand shaft 33 through one turn per hour and the hour hand shaft 36 through one turn per 12 hours. When the excitation pattern cycle is changed in the opposite direction to that described above, the magnet rotor 1 rotates in the opposite direction to that described above, thereby correcting the time. FIGS. 11 and 12 show the excitation pattern (N, S, N, S), and FIG. 13 shows the excitation pattern (N, S, S, N).

In the conventional stepping motor described above, as shown in FIG. 11, the excitation coil 6 (13) is wound on the bobbin 40, and a plate-like yoke 41 is arranged in each bobbin 40. The other end portions 9 and 10 of the stators 4 and 5 are inserted in the corresponding bobbin 40, and these other end portions are magnetically connected through the yoke 41. Therefore, the stator assemblies 2 and 3 are cumbersome to assemble. The upper and lower stator assemblies 2 and 3 are arranged around the magnet rotor 1 to be 180° out of phase from each other. Also, the terminals 42 formed at the two end portions of one bobbin 40 to connect the end portions of the excitation coil 6, and the terminals 42 formed at the two end portions of the other bobbin 40 to connect the end portions of the excitation coil 13, are extracted in the opposite directions. Therefore, connections of external wires cannot be concentrated at one portion. Furthermore, since the bobbins 40 are required, the number of components is large, making the assembly cumbersome.

A stepping motor is proposed in which two stator assemblies each constituted by two stators (a total of four stators) are integrally formed by molding in a motor housing. FIGS. 14 and 15 show a stepping motor having such a structure and used in the exhaust gas recirculating system of an automobile engine.

FIG. 14 shows the exhaust gas recirculating system of the automobile engine, and FIG. 15 shows the stepping motor used in this system. As shown in FIGS. 14 and 15, in the exhaust gas recirculating system, an exhaust pipe 51 and an intake pipe 52 both connected to an engine body 50 are connected to each other through an exhaust gas circulation channel 53. When an exhaust gas inlet port 53a of the exhaust gas circulation channel 53 is controlled to be opened/closed by a control valve 55 driven by a stepping motor 54, the amount of exhaust gas flowing from the exhaust pipe 51 into the exhaust gas circulation channel 53 is adjusted. The control valve 55 has a valve shaft 57, a plug 58, a compression coil spring 59, and the like, as shown in FIG. 15. The valve shaft 57 is disposed in a housing 56 integrally formed with the outer surface of the exhaust pipe 51 to be movable forward/backward. The plug 58 is integrally formed with the distal end of the valve shaft 57. The compression coil spring 59 biases the valve shaft 57 in a direction to cause the plug 58 to close the exhaust gas inlet port 53a. A discharge port 53b communicating with the exhaust gas circulation channel 53 is formed in the outer surface of the housing 56.

The stepping motor 54 has a stator assembly 62 and a magnet rotor 60. The stator assembly 62 is formed by molding and disposed in a motor housing 61. The magnet rotor 60 is fitted in the stator assembly 62 at an appropriate gap and is rotatably, axially supported by bearings 63.

The magnet rotor 60 is formed cylindrically, and an end portion of the valve shaft 57 on a side opposite to the plug 58 is fitted in a central hole 60a of the magnet rotor 60 to be slidable and non-rotatable in the direction of an axis K2. More specifically, the intermediate portion of the valve shaft 57 is held by an oil metal 67 disposed in the motor housing 61 to be slidable and non-rotatable. A male thread 68 is formed on the outer surface of the rotor-side end portion of the valve shaft 57. This male thread 68 threadably engages with a screw body 69 fixed in the central hole 60a of the magnet rotor 60. The screw body 69 is formed cylindrically from a synthetic resin or the like, and forms a female thread 69a on its inner circumferential surface to threadably engage with the male thread 68. Accordingly, when rotation of the magnet rotor 60 is transmitted to the male thread 68 through the screw body 69, the valve shaft 57 moves forward/backward in the axial direction. If the valve shaft 57 moves forward, the plug 58 closes the inlet port 53a.

The stator assemblies 62 are constituted by four stators, i.e., a pair of stators 62a and 62b, and a pair of stators 62c and 62d, respectively. Of these stators 62a to 62d, the outer stators 62a and 62d are integrally formed with bent portions 72 on their outer surfaces, respectively. These bent portions 72 are bent toward the remaining stators 62b and 62c respectively paired with stators 62a and 62d. The stators 62a and 62d are magnetically coupled to the stators 62b and 62c through the bent portions 72, respectively. Excitation coils 64 wound on bobbins 74 are accommodated in the stators 62a and 62b, and 62c and 62d that constitute the respective stator pairs. The respective excitation coils 64 are connected to terminals 70.

An intermediate plate 71 made of a nonmagnetic material, e.g., aluminum, is interposed between the stators 62b and 62c to prevent magnetic interference between these two stator assemblies.

In the fabrication of this stator assemblies 62, the respective stator assemblies are formed separately and stacked, and are integrated with the motor housing 61. More specifically, the excitation coil 64 wound on one bobbin 74, the terminal 70, and the stator 62b are integrally molded with a synthetic resin 73, and the stator 62a is fitted on the resultant structure, thereby constituting one stator assembly. Also, the excitation coil 64 wound on the other bobbin 74, the terminal 70, and the stator 62c are integrally molded with a synthetic resin 73, and the stator 62d is fitted on the resultant structure, thereby constituting the other stator assembly. These stator assemblies are stacked through the intermediate plate 71, loaded in a mold, and molded, thereby integrating the motor housing 61 and the stator assemblies 62.

In the conventional stepping motor 54 shown in FIG. 15, after one stator (62b, 62c) of a stator pair, the excitation coil 64, and the terminal 70 are molded, the other stator (62a, 62d) of the same pair must be mounted in the resultant structure to form each stator assembly. Therefore, two stator assemblies each obtained in this manner must be stacked. The management of product size becomes cumbersome and the number of assembly steps is increased accordingly. The assembly of the stators is thus cumbersome. Also, since the bobbins 74 are used in the same manner as in the conventional stepping motor described above, the number of components is increased.

In order to solve these problems, a stepping motor is proposed in which excitation coils are wound on the outer surfaces of the magnetic pole portions of stator pairs through a molded resin without using bobbins (Japanese Patent Laid-Open No. 61-12176; to be referred to as the prior-art invention hereinafter). In this stepping motor, as shown in FIG. 5, four stators each having an annular magnetic plate and pole teeth that are formed inside the annular plate to be perpendicular to the annular plate, thus forming magnetic pole portions, are combined such that two stators are paired. The two stators of each pair are arranged such that their pole teeth oppose each other, and are molded to constitute a stator assembly. The surface portion of each stator assembly on which an excitation coil is tightly wound is covered with a molded resin. The resultant stator assemblies are inserted in a cylindrical yoke serving also as a frame.

As shown in FIG. 5, those stator assemblies have a structure in which four stators 4, 5, 11, and 12 are stacked such that the magnetic pole portions (110) of each stator are shifted from those of the remaining stators by a half pitch. Although the four stators 4, 5, 11, and 12 have slightly different shapes, the stators 4 and 5 of one pair have the same shape and the stators 11 and 12 of the other pair have the same shape. As the two upper and lower stators 4 and 12, ones obtained by pressing with the same press tool are used such that the magnetic pole portions of one stator oppose those of the other stator. In other words, one of the two stators 4 and 12 is obtained by reversing the other. Regarding the intermediate stators 5 and 11, although they are different from the stators 4 and 12, they have the same shape. Thus, as the stators 5 and 11, two stators obtained by pressing with the same press tool, which is different from the press tool used for pressing the stators 4 and 12, are used, while one of them is reversed.

Since the prior-art invention described above does not require bobbins, the number of components can be decreased, thereby facilitating the manufacture. However, it is difficult to set the outer circumferential surfaces of all of the four stators to coincide with each other.

More specifically, due to an error in size precision of the respective press tools, if the outer diameter of the stators 4 and 12 is different from that of the stators 5 and 12, or if the stators 4 and 12 are decentered from the stators 5 and 12, when the four stators 4, 5, 11, and 12 are stacked such that the centers of their magnetic pole portions coincide with each other, stepped portions are undesirably formed in the outer circumferential surfaces of the respective stators.

Such stepped portions can also be formed when the four stators are formed by molding. In molding, when a molded resin is cooled, it shrinks in the axial and radial directions of the stator. This shrinkage is not constant in the respective portions of the molded resin, and differs depending on the thickness, shape, and the like of the stators. Therefore, if the molded resin shrinks in the radial direction, the positional displacements of the respective stators accompanying this shrinkage differ among the respective stators, thereby forming stepped portions in the outer circumferential surfaces of the stators.

In this manner, in the prior-art invention, stepped portions are formed in the outer circumferential surfaces of the stators depending on the outer diameters of the stators and decentering among the stators, and due to the shrinkage of the molded resin after molding. If stator assemblies having such stepped portions are inserted in the yoke serving as a frame, gaps are formed between the stators and the yoke, consequently decreasing the magnetic efficiency. However, it is very difficult to eliminate these stepped portions in the manufacture.

SUMMARY OF THE INVENTION

It is an object of the present invention to provide a stepping motor in which the outer diameters of stators need not be managed and a yoke can be brought into tight contact with excitation coils in order to increase magnetic efficiency.

It is another object of the present invention to provide a stepping motor that can be assembled easily, in which the number of components is decreased and the yoke can be reliably mounted on the stator assemblies.

In order to achieve the above objects, according to the present invention, there is provided a stepping motor comprising a magnet rotor on which magnetic poles of opposite polarities are alternately, equidistantly arranged in a circumferential direction, four annular stators having the same inner diameter and the same outer diameter and concentrically arranged at predetermined gaps in an axial direction of the magnet rotor, every adjacent two of the four annular stators being paired, excitation coils respectively wound on the pairs of the annular stators, and a U-shaped yoke arranged adjacent to outer circumferential surfaces of the annular stators, wherein each of the annular stators constituting the respective pairs has an annular plate having the inner diameter and a central hole in which the magnet rotor is to be inserted, and pole teeth that form magnetic pole portions separated from the magnet rotor at a predetermined gap, the pole teeth of one annular stator of a given pair extend from the annular plate to be perpendicular to the other annular stator of the given pair, and are equidistantly arranged around the central hole to be shifted from the pole teeth of the other annular stator by a half pitch, an appropriate number of mounting holes are formed in each annular plate at predetermined spaces in the circumferential direction, and the mounting holes formed in the annular plates of the annular stators of different pairs that are arranged back to back are located at the same positions, the four annular stators are integrated by the molding, and insulating films obtained by the molding are formed on surfaces, which do not oppose the magnet rotor, of the annular stators constituting the respective pairs, the insulating films are coupled to each other through the mounting holes formed in the annular plates of the annular stators of the different pairs that are arranged back to back, the excitation coils are wound on the annular stators constituting the respective pairs through the insulating films, and the yoke is a plate-like body and has a major portion which is inserted between opposing surfaces of the annular plates adjacent to the outer circumferential surfaces of the annular stators constituting the pairs.

DESCRIPTION OF THE PREFERRED EMBODIMENTS

The present invention will be described by way of its preferred embodiments shown in the accompanying drawings.

Figure 1:
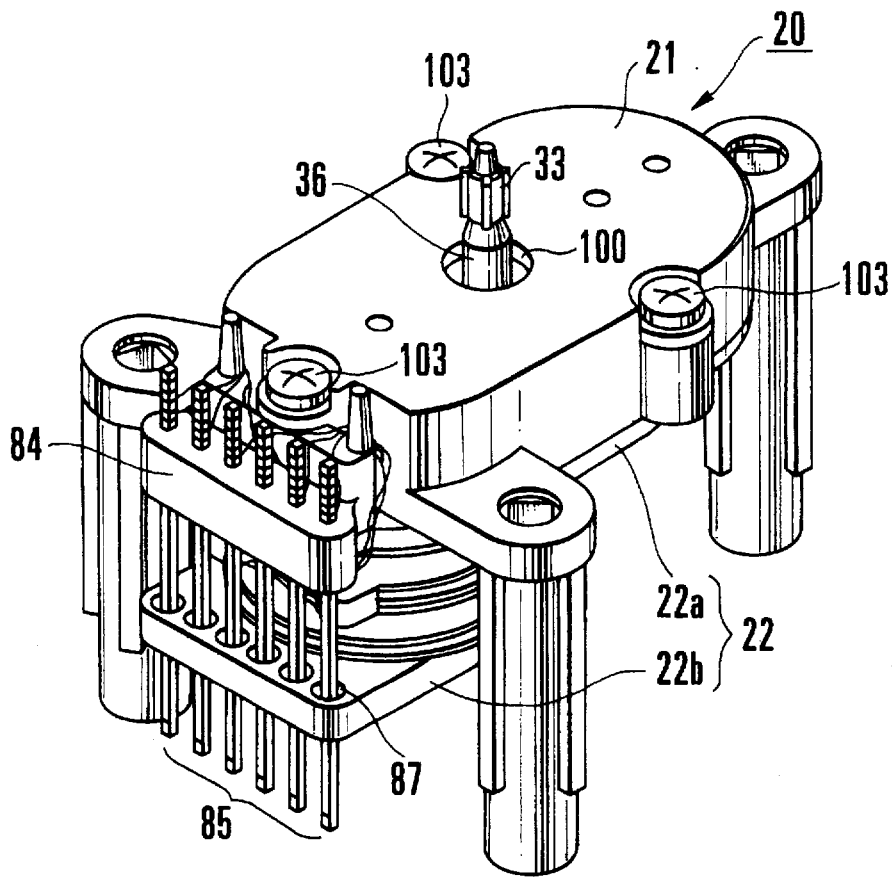
FIG. 1 is a perspective view showing the outer appearance of a stepping motor according to the present invention.
Figure 2:
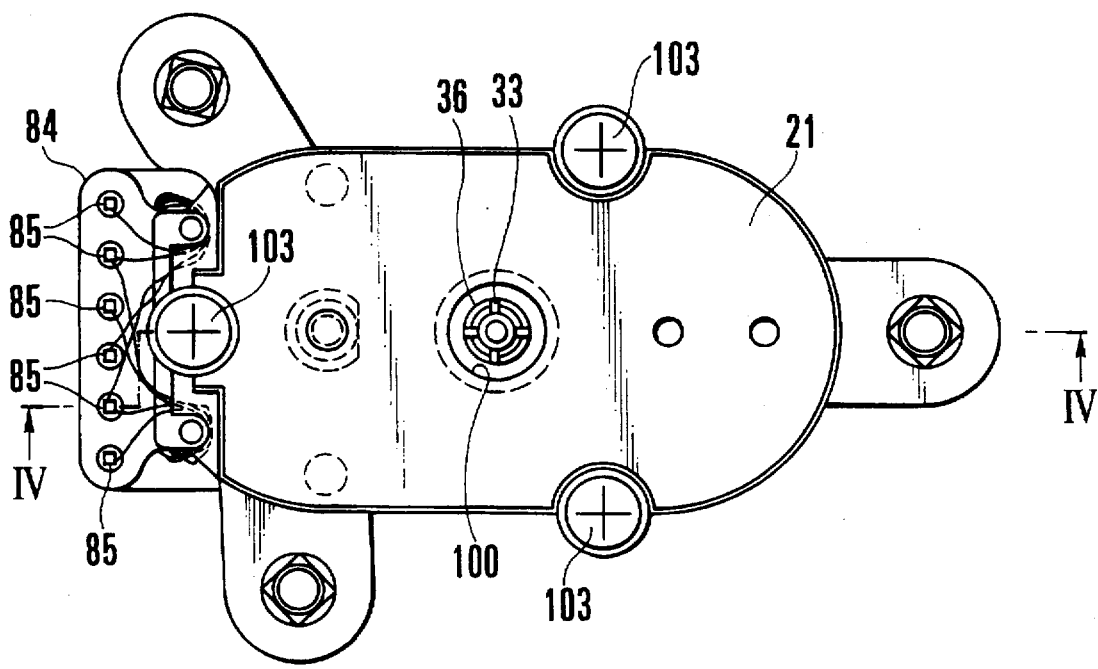
FIG. 2 is a plan view of this stepping motor.
Figure 3:
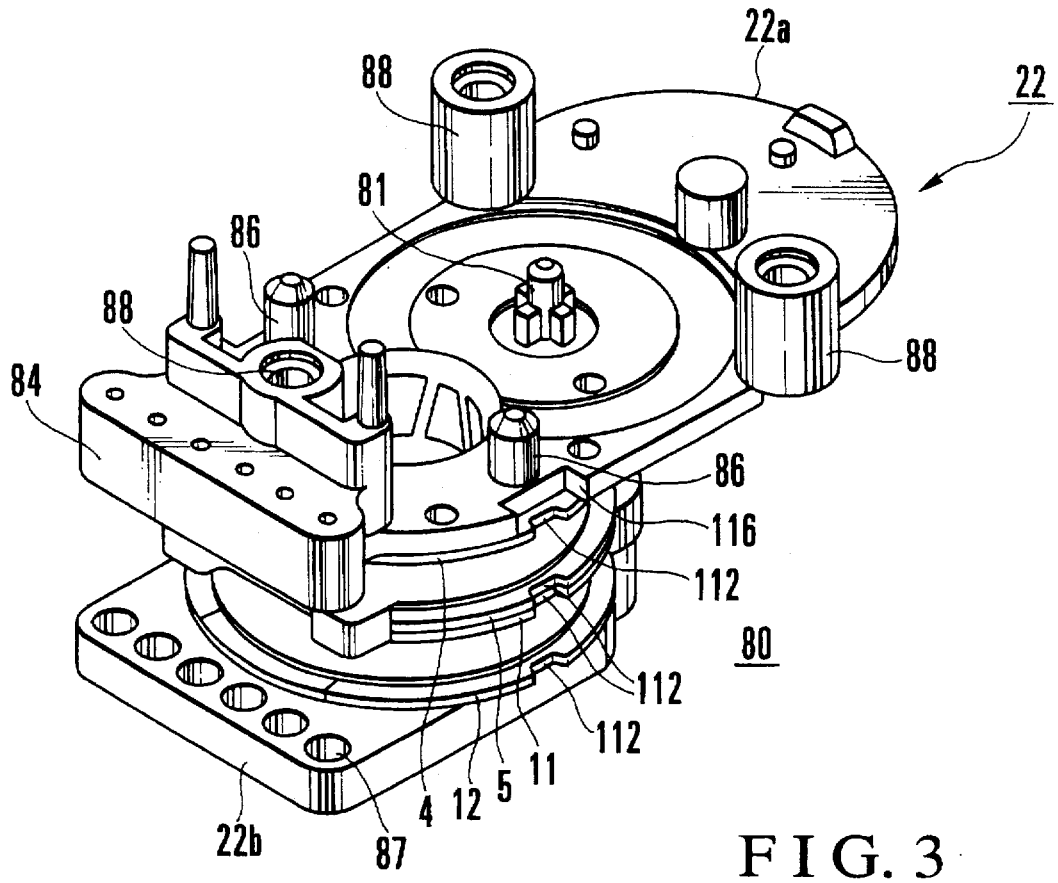
FIG. 3 is a perspective view of a molded stator body from which an upper case is removed.
Figure 4:
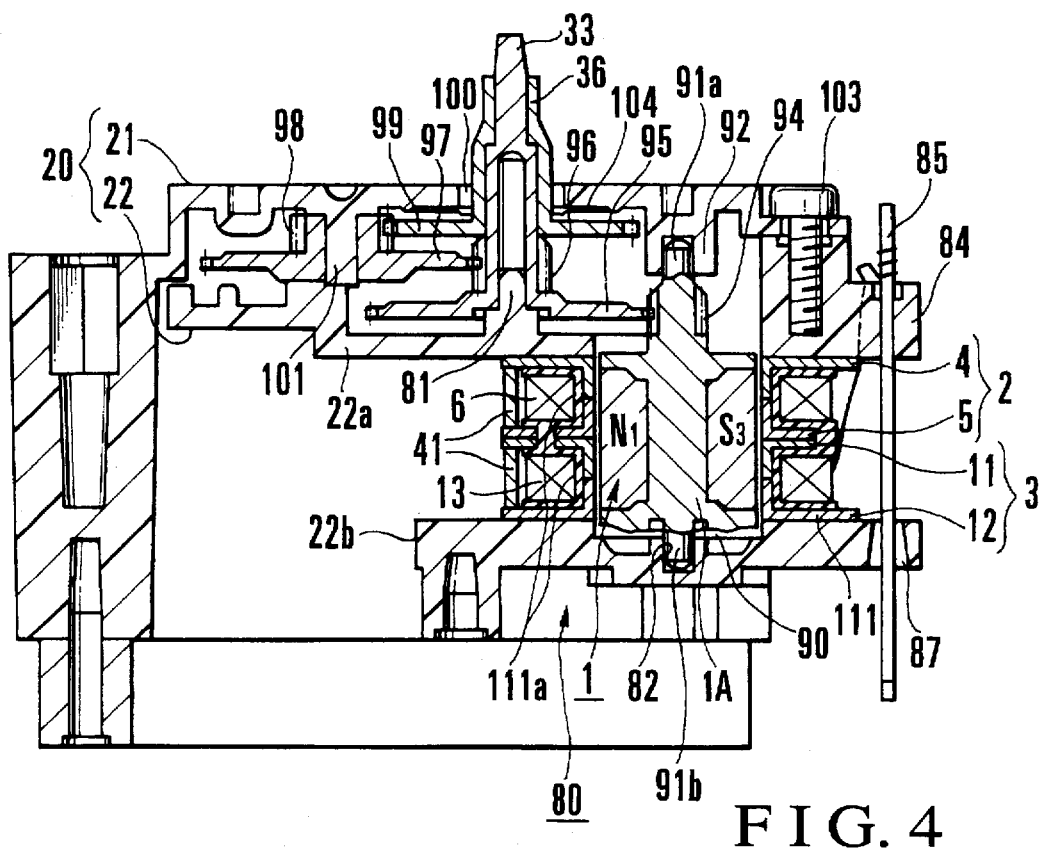
FIG. 4 is a sectional view taken along the line IV—IV of FIG. 2.
Figure 5:
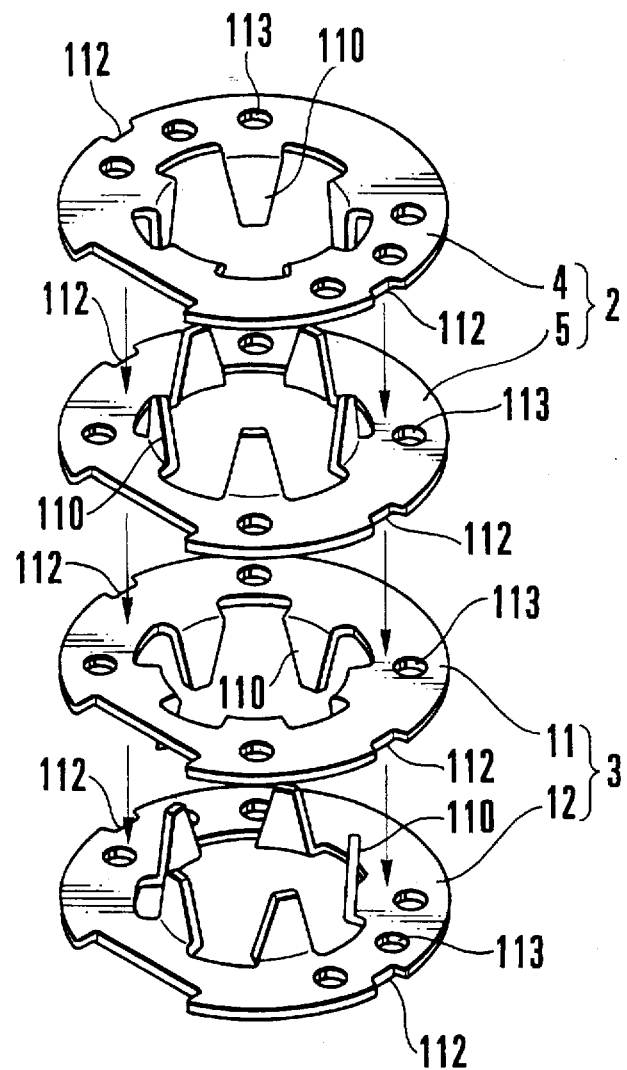
FIG. 5 is a perspective view of stators.
Figure 6A:
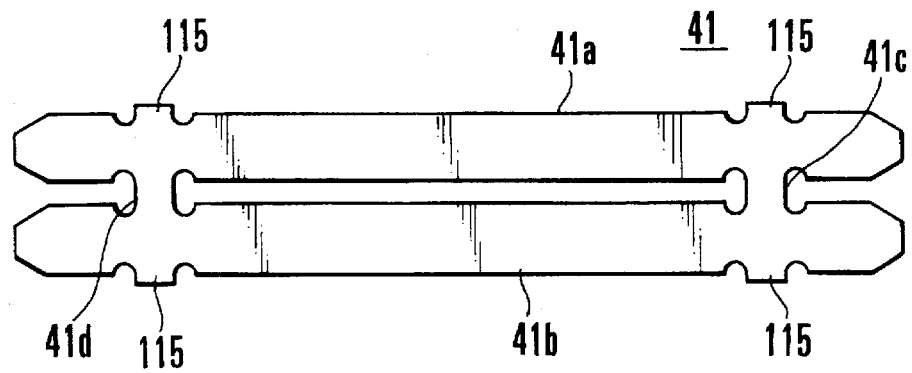
FIG. 6A is a developed view of the yoke.
Figure 6B:
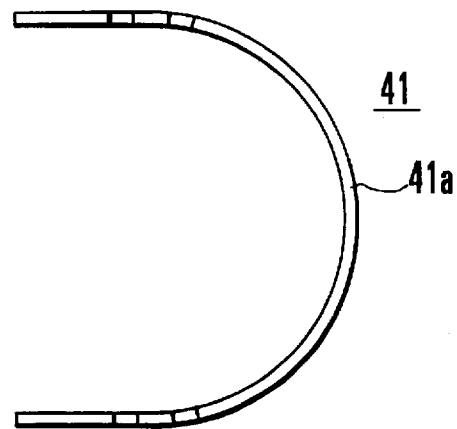
FIG. 6B is a plan view of the yoke which is bent.
Figure 7:
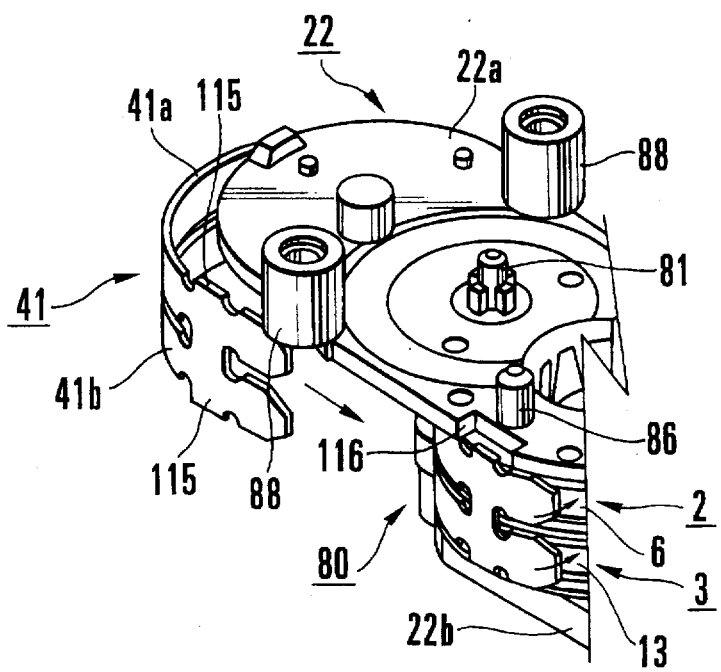
FIG. 7 is a view for explaining how to mount the yoke.

FIGS. 1 to 7 show the first embodiment in which the present invention is applied to a stepping motor for a clock, in which FIG. 1 shows the outer appearance of this stepping motor, FIG. 2 shows the upper surface of this motor, FIG. 3 shows stators from which an upper case is removed, FIG. 4 shows a section taken along the line IV—IV of FIG. 2, FIG. 5 shows the stators, FIGS. 6A and 6B show a developed yoke and a bent yoke, respectively, and FIG. 7 explains how to mount the yoke. The constituent members and the like that are identical to those shown in the description of the prior-art technique are denoted by the same reference numerals, and a description thereof will be omitted as needed.

Referring to FIGS. 1 to 7, stators 4, 5, 11, and 12 have the same inner diameter and the same outer diameter, and are concentrically arranged at predetermined gaps in the axial direction of a magnet rotor 1. Every two adjacent stators, i.e., the stators 4 and 5, and the stators 11 and 12 are paired, thereby constituting stator assemblies 2 and 3. These stators 4, 5, 11, and 12 are integrally formed by molding together with a lower case 22, thereby forming one component, i.e., a molded stator body 80. Therefore, the surfaces of the stators 4 and 5, and 11 and 12 respectively constituting the stator assembles 2 and 3 with which excitation coils 6 and 13 come into tight contact, i.e., the surfaces of pole teeth 110 (to be described later) constituting the respective magnetic pole portions but not opposing the magnet rotor 1 are covered with cover portions (resin cover portions) 111a of a molded resin 111, as shown in FIG. 4.

As shown in FIG. 4, the lower case 22 is constituted by an upper plate portion 22a and a lower plate portion 22b horizontally parallel to each other. Bearing portions 81 and 82 for rotatably, axially supporting a minute hand shaft 33 and a lower end portion 91b of a shaft 1A of the magnet rotor 1, respectively, are integrally formed on the upper surface sides of the two plate portions 22a and 22b. The bearing portion 81 of the minute hand shaft 33 comprises a projecting element having a circular section, and the bearing portion 82 of the magnet rotor 1 forms a circularly recessed portion.

A terminal holding portion 84, a plurality of positioning pins 86 for positioning and fixing an upper case 21, and screw mounting portions 88 (FIG. 3) integrally extend vertically from the upper plate portion 22a.

The terminal holding portion 84 extends behind the upper plate portion 22a to concentrate and hold a plurality of terminals 85 to which the end portions of the excitation coils 6 and 13 are to be connected. The lower end portions of the terminals 85 extend below the lower case 22 through small holes 87 formed in the lower plate portion 22b and are electrically connected to the drive circuit of a printed circuit board (not shown). When the plurality of terminals 85 are concentrated at one portion in this manner, external wires can be connected easily.

In the same manner as the conventional magnet rotor described above, the magnet rotor 1 is magnetized to have five pairs of 10 poles (N1 to N5 and S1 to S5) alternately and equidistantly in the circumferential direction. This magnet rotor 1 is inserted in a central hole 90 (FIG. 4) of the molded stator body 80 such that the center of the molded stator body 80 coincides with the center of the shaft 1A. An upper end portion 91a and the lower end portion 91b of the shaft 1A are rotatably, axially supported by a cylindrical bearing portion 92 extending vertically from the inner surface of the upper case 21 and the bearing portion 82, respectively.

Rotation of the magnet rotor 1 is reduced by a gear 94 mounted on the upper portion of the shaft 1A and a gear 95 meshing with the gear 94, and is transmitted to the minute hand shaft 33. Rotation of the minute hand shaft 33 is transmitted to the hour hand shaft 36 through a gear 96, a minute wheel (reduction gear) 97, a gear 98, and a gear 99. The hour hand shaft 36 is rotatably fitted on the minute hand shaft 33, and its upper end portion projects upward together with the minute hand shaft 33 through a hole 100 of the upper case 21. The minute wheel 97 is rotatably, axially supported by a shaft 101 extending vertically downward from the inner surface of the upper case 21, and its lower surface is supported by the upper surface of the upper plate portion 22a of the lower case 22. The upper case 21 is fixed to the upper surface of the upper plate portion 22a by a plurality of set screws 103, thus covering the magnet rotor 1, the minute hand shaft 33, the hour hand shaft 36, the gears 94, 95, 97, 99, . . . , and the like. A clock retaining spring 104 is mounted on the outer surface of the lower end portion of the hour hand shaft 36. Upon being pressed against by the inner surface of the upper case 21, the clock retaining spring 104 biases the minute hand shaft 33 and the hour hand shaft 36 downward, thereby preventing backlash in the thrust direction.

As shown in FIG. 5, each of the annular stators 4, 5, 11, and 12 consists of an annular plate having a central hole for receiving the magnet rotor 1 therein, and the five triangular pole teeth 110 bent at substantially the right angle with respect to the annular plate to form stator magnetic pole portions. The respective annular plates have substantially the same shape. The adjacent annular stators 4 and 5, and 11 and 12 are arranged to form pairs such that their pole teeth 110 oppose each other, thereby forming an upper stator assembly 2 and a lower stator assembly 3, respectively.

The pole teeth 110 of each stator are disposed equidistantly in the circumferential direction on the inner circumferential side of the central hole of the corresponding annular plate, and their inner side surfaces oppose the outer circumferential surface of the magnet rotor 1 at a predetermined gap, to form the inner wall surface of the central hole 90 (FIG. 4) of the molded stator body 80. As shown in FIG. 4, the excitation coils 6 and 13 are directly wound on the outer sides of the pole teeth 110, i.e., the sides of the pole teeth 110 not opposing the magnet rotor 1, through the cover portions 111a formed by molding of the molded stator body 80. At this time, the cover portions 111a serve as bobbins. These excitation coils 6 and 13 are wound after the stators 4, 5, 11, and 12 and the lower case 22 are molded.

As shown in FIG. 5, a pair of recessed positioning portions 112 are formed in the periphery of each of the stators 4, 5, 11, and 12 to be 180° out of phase from each other. When the four stators are stacked such that their recessed positioning portions 112 coincide, in each of the stator assemblies 2 and 3, the pole teeth 110 of one stator are located between the pole teeth of the other stator. In other words, the stators 4 and 5, and 11 and 12 are stacked such that their pole teeth 110 are shifted by a half pitch.

The annular stators 5 and 11 of different pairs are stacked back to back. An arbitrary number of insertion holes 113 are formed in each of the stators 4, 5, 11, and 12. These insertion holes 113 are filled with the molded resin 111 to increase the connecting strength between the stators 5 and 11, and 4 and 12.

These stators 4, 5, 11, and 12 are stacked such that their pole teeth 110 are shifted from each other by a half pitch. Therefore, the stators 4 and 12 are formed by pressing with one press tool, while the stators 5 and 11 are formed by pressing with another press tool.

A yoke 41 that forms a magnetic circuit together with the stators 4, 5, 11, and 12 consists of two thin, elongated plate portions 41a and 41b, and coupling portions 41c and 41d, as shown in FIG. 6A. The plate portions 41a and 41b are formed by, e.g., punching a metal plate, to be parallel to each other. The coupling portions 41c and 41d couple these plate portions 41a and 41b at their two end portion sides. In other words, the yoke 41 is a plate-like member having a slit formed between the plate portions 41a and 41b. When arranging the yoke 41 to be adjacent to the circumferential edges of the annular stators 4 and 5, and 11 and 12, the annular stators 5 and 11 of the different pairs that are arranged back to back are inserted in this slit, as will be described later.

The two end portions of each of the coupling portions 41c and 41d project from the yoke 41 upward and downward for appropriate lengths to form engaging portions 115 that position the yoke 41 with respect to the stators 4, 5, 11, and 12.

This yoke 41 is bent to be a substantially U shape, as shown in FIG. 6B, and is inserted and located from the lateral side of the molded stator body 80, as shown in FIG. 7. The arcuated portion of the yoke 41 has substantially the same size as that of the outer shape of the combination of the excitation coils 6 and 13. Consequently, the plate portions 41a and 41b of the yoke 41 are respectively fitted between the stators 4 and 5 constituting the stator assembly 2 and between the stators 11 and 12 constituting the stator assembly 3, that is, they are inserted between the opposing surfaces of the annular plates of the stators 4 and 5, and 11 and 12, to cover the excitation coils 6 and 13.

At this time, the upper engaging portions 115 engage with the recessed positioning portions 112 of the stator 4, the lower engaging portions 115 engage with the recessed positioning portions 112 of the stator 12, and the coupling portions 41c and 41d engage with the recessed positioning portions 112 of the stators 5 and 11, thereby positioning and locking the yoke 41 with the stator assemblies 2 and 3. In order to ensure magnetic coupling with the stators 4, 5, 11, and 12, the linear distal end portions of the plate portions 41a and 41b are bent inward about their portions near the coupling portions 41c and 41d as the fulcrums. In this case, since the plate portions 41a and 41b are fitted between the stators 4 and 5, and 11 and 12 of the respective pairs, they can come into tight contact with the excitation coils 6 and 13, respectively.

In FIG. 7, reference numeral 116 denotes a notched recessed portion 116 for clearing the corresponding engaging portion 115 of the yoke 41.

The distal end portions of the yoke 41 are bent along the outer surfaces of the stator assembles 2 and 3 and inserted between the annular stators 4 and 5, and 11 and 12, to cover the excitation coils 6 and 13. When the distal end portions of the yoke 41 are bent in this manner, the contact area between the yoke 41 and the stators 4, 5, 11, and 12 is increased, thereby improving the magnetic efficiency.

In the stepping motor having this structure, the stators 4 and 5, and 11 and 12 constituting the pair of stator assemblies 2 and 3 are integrally formed by molding, and the excitation coils 6 and 13 are directly wound on the outer surfaces of the resin cover portions 111a. Therefore, conventionally required bobbins become unnecessary to decrease the number of components. In particular, in the present invention, the excitation coils 6 and 13 are wound on the outer circumferential surfaces of the magnetic pole portions of the stators 4 and 5, and 11 and 12 of the stator assemblies 2 and 3, and thereafter the plate portions 41a and 41b of the yoke 41 are inserted between the opposing surfaces of the stators 4 and 5, and 11 and 12 of the respective pairs of stator assemblies 2 and 3. Thus, even if stepped portions are undesirably formed in the outer circumferential surfaces of the stators 4, 5, 11, and 12 due to the manufacture error, decentering, shrinkage of the molded resin, and the like, no problem occurs at all, and the outer diameters of the stators can be managed more easily than in the prior-art invention described above.

Since the yoke 41 can be locked by the molded stator body 80 through engagement between the engaging portions 115 and the recessed positioning portions 112, the yoke 41 can be mounted easily and can be reliably fixed at a predetermined position. Also, the yoke 41 can be brought into tight contact with the excitation coils 6 and 13.

Since the bearing portions 81 and 82 of the minute hand shaft 33 and the magnet rotor 1, and the terminal holding portion 84 of the terminals 85 are integrally provided in the lower case 22, the number of components can be further decreased.

Since the plurality of terminals 85 to which the excitation coils 6 and 13 are connected are concentrated on the terminal holding portion 84, external wires can be connected easily.

In the embodiment described above, the stators 4, 5, 11, and 12, and the lower case 22 are integrally formed by molding to constitute the molded stator body 80. However, the present invention is not limited to this. If the stators are to be provided on the upper case 21 side, the stators 4, 5, 11, and 12, and the upper case 21 may be integrally formed by molding to constitute a molded stator body.

Figure 8:
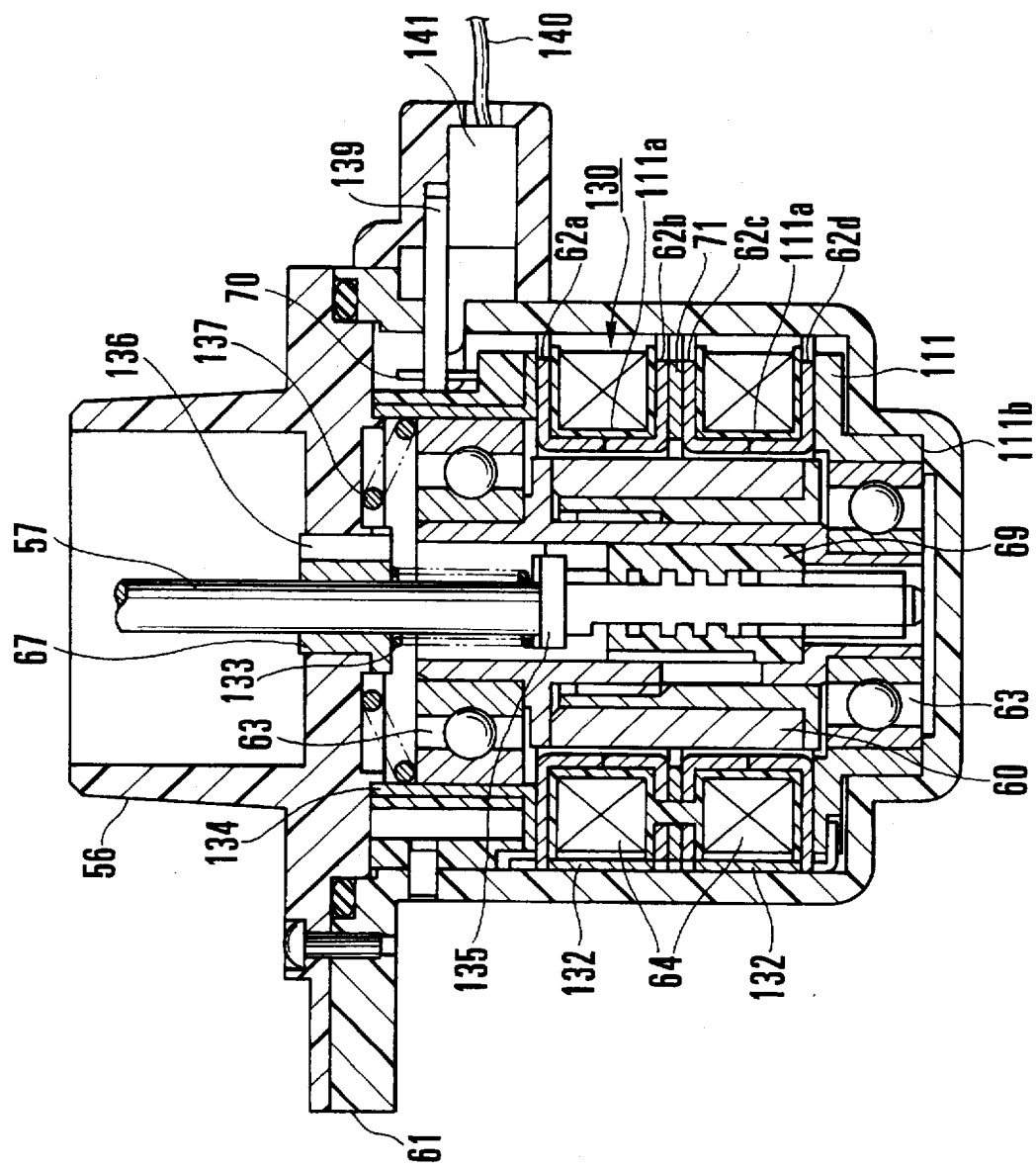
FIG. 8 is a sectional view showing an embodiment in which the present invention is applied to a stepping motor for an EGR valve.

FIG. 8 shows the second embodiment in which the present invention is applied to a stepping motor for an EGR valve. In this embodiment, four stators 62a to 62d concentrically arranged at predetermined gaps in the axial direction, terminals 70, and a metal cylinder 134 are integrally formed by molding with a synthetic resin to constitute a molded stator body 130. The outer circumferential surfaces of the magnetic pole portions of the stators 62a and 62b, and 62c and 62d of the respective pairs, and the surfaces of these stators opposing each other in the axial direction are covered with cover portions 111a of a molded resin 111. Excitation coils 64 are wound on the outer surfaces of the magnetic pole portions.

A yoke 132 is fitted between the stators 62a and 62b, and 62c and 62d of the respective pairs, and is detachably fixed through engagement of engaging portions (not shown) and recessed portions formed in the yoke 132. This yoke 132 is formed to have a U shape completely the same as that of the yoke 41 (see FIGS. 6A and 6B) shown in the above embodiment, and its distal end portions are bent along the outer surfaces of the excitation coils 64 (FIG. 7).

The cylinder 134 and a cylindrical portion 111b formed at the lower end portion of the molded resin 111 respectively form bearing holding portions, thereby respectively holding bearings 63 axially supporting a magnet rotor 60.

The terminals 70 are connected to a printed circuit board 139, and the printed circuit board 139 is connected to a lead wire 140 through a connector 141.

More specifically, the molded stator body 130, the bearing holding members for rotatably, axially supporting the magnet rotor 60, and the terminals 70 to which the end portions of the excitation coils 64 are connected are integrally formed by molding.

A valve shaft 57 is disposed in the magnet rotor 60 to be movable forward/backward. The intermediate portion of the valve shaft 57 is rotatably, axially supported by an oil metal 67 disposed in a housing 56. The valve shaft 57 is biased by a compression coil spring 133 toward the magnet rotor 60. This aims at removing backlash in the meshing between the valve shaft 57 and a screw body 69. A pin 135 extends at the intermediate portion of the valve shaft 57, and one end of the compression coil spring 133 presses against the pin 135 through a washer. Rotation of the oil metal 67 is prevented by a pin 136. A conical coil spring 137 for pressing the upper bearing 63 in FIG. 8 and the magnet rotor 60 are elastically mounted between this bearing 63 and the housing 56. This upper bearing 63 axially supports the magnet rotor 60.

Figure 15:
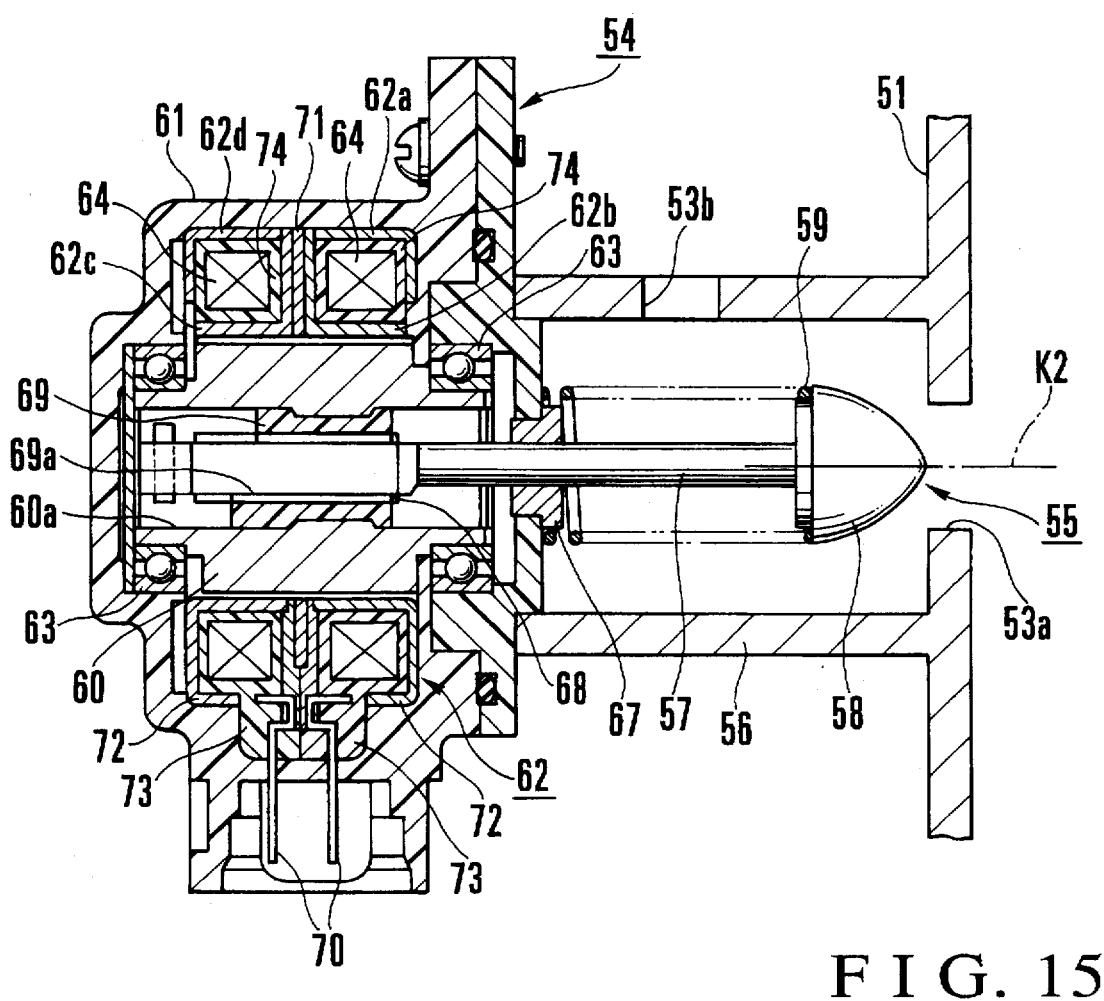
FIG. 15 is a sectional view of a stepping motor used in this system.

The remaining arrangement of this embodiment is substantially the same as that of the conventional stepping motor shown in FIG. 15. Thus, the same constituent members and the like as in FIG. 15 are denoted by the same reference numerals, and a description thereof will be omitted.

In this structure as well, the yoke 132 is fitted between the stators 62a and 62b, and 62c and 62d of the respective pairs. Therefore, the same effect as in the first embodiment described above can be obtained.

Since the molded stator body 130, the bearing holding members, and the terminals 70 are integrally molded, the number of components can be decreased, thereby simplifying the assembly process.

Figure 9:
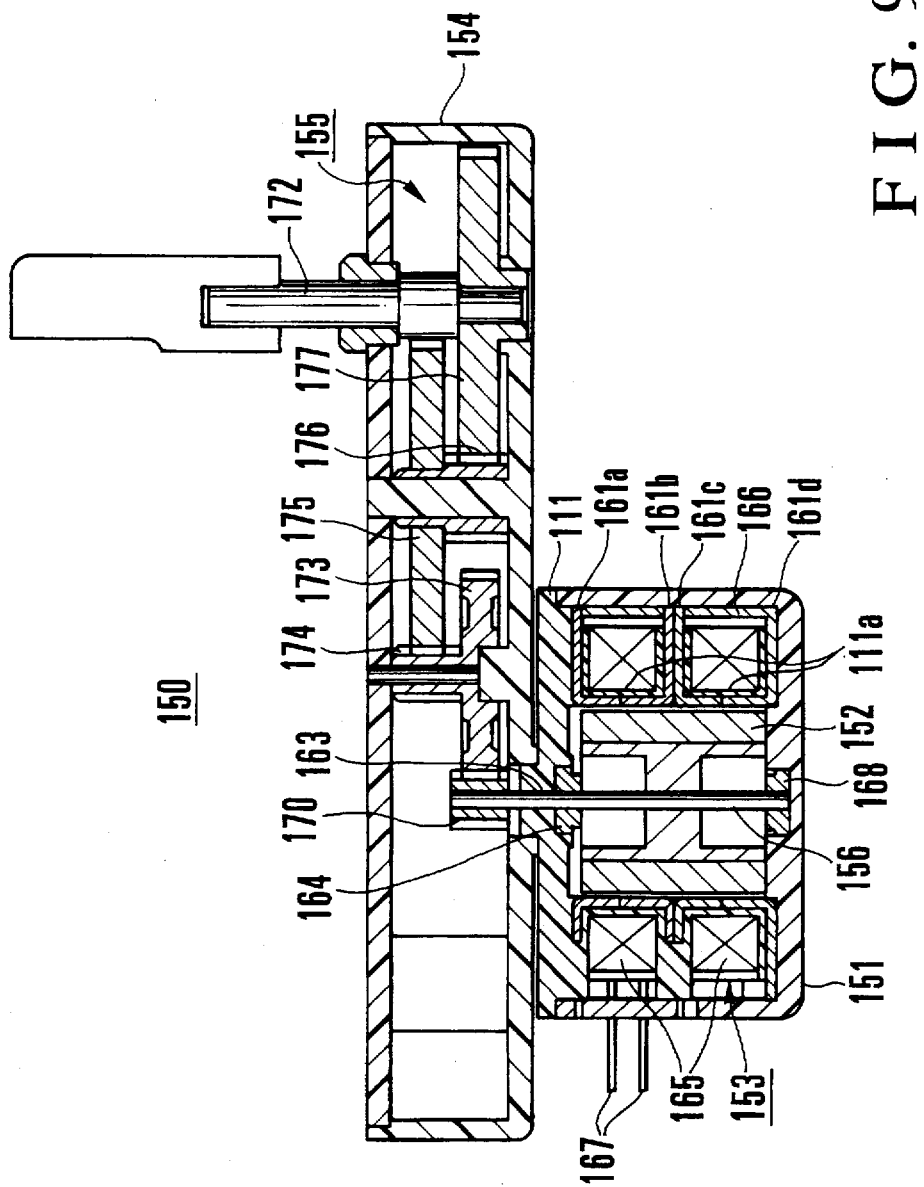
FIG. 9 is a sectional view showing an embodiment in which the present invention is applied to a geared motor.
Figure 10:
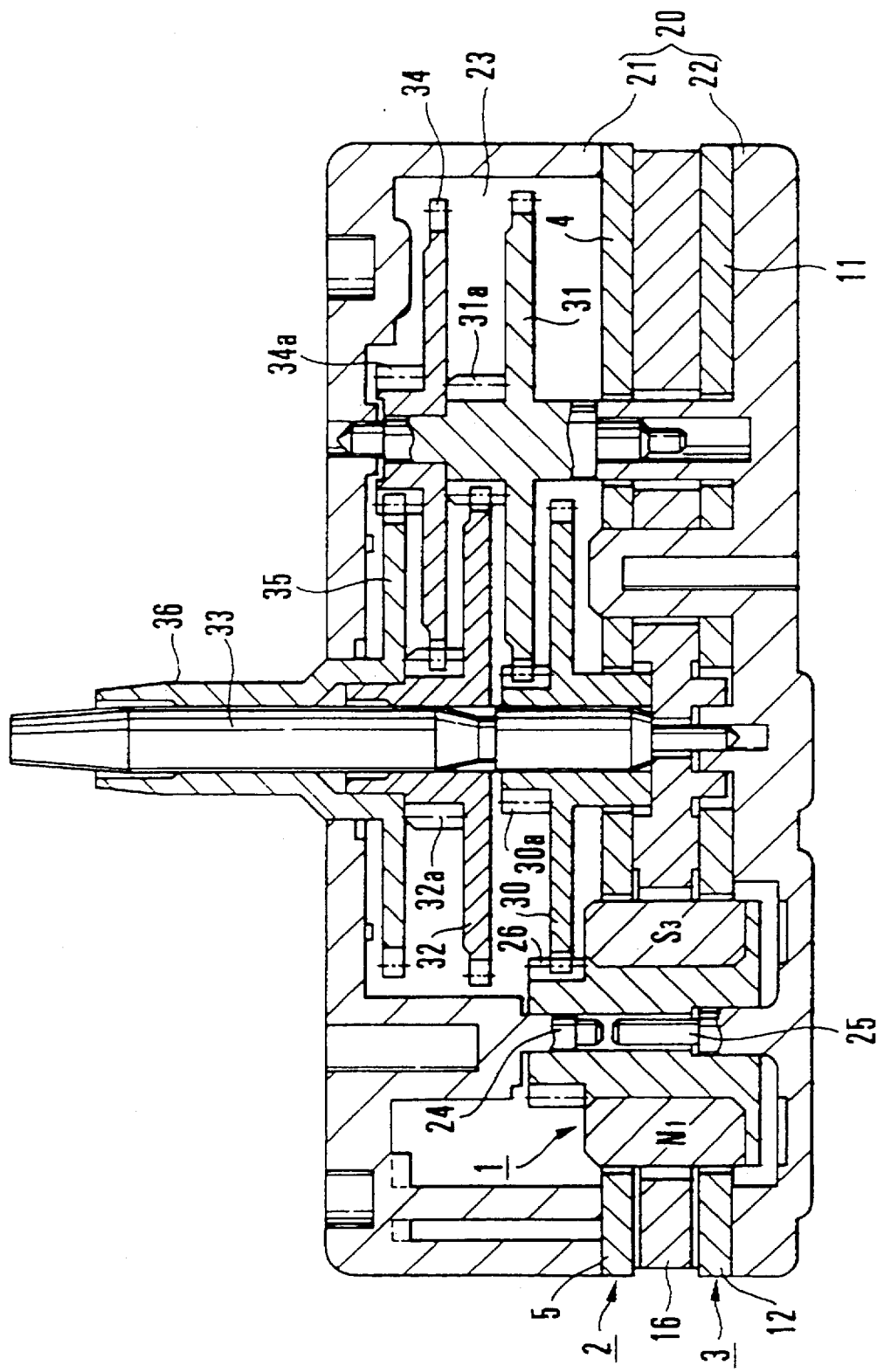
FIG. 10 is a sectional view showing a conventional stepping motor.
Figure 11:
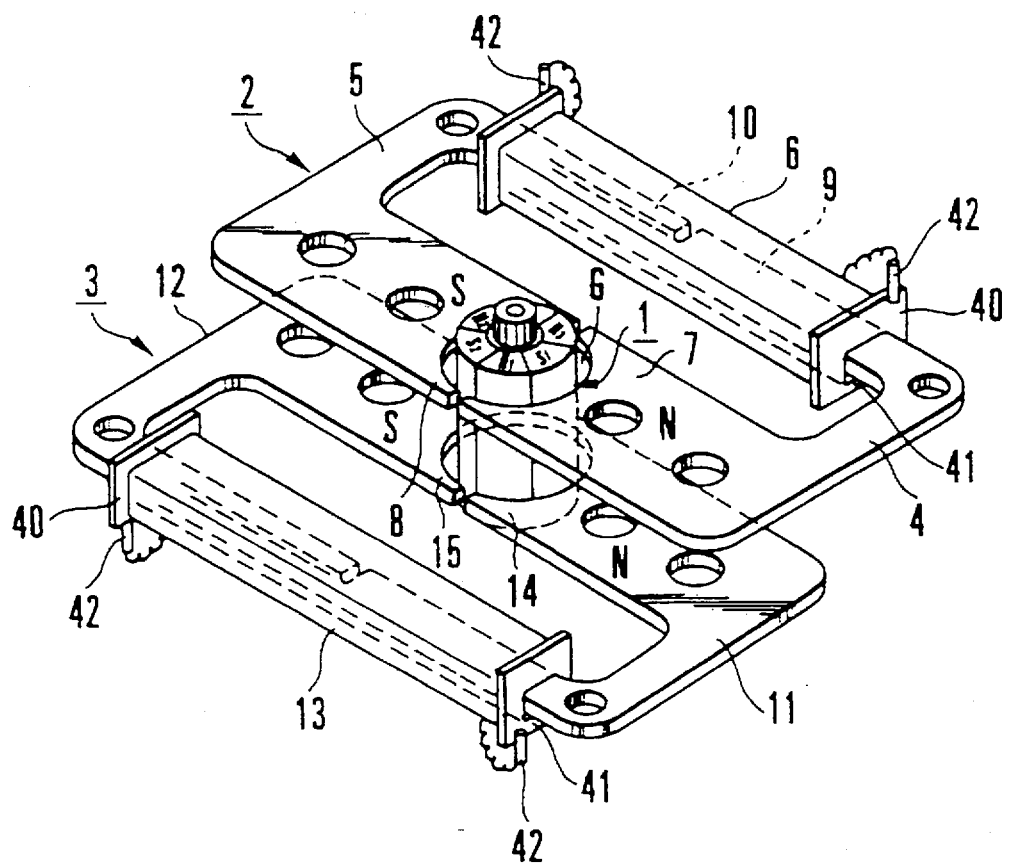
FIG. 11 is a perspective view of a magnet rotor and stator assemblies.
Figure 12:
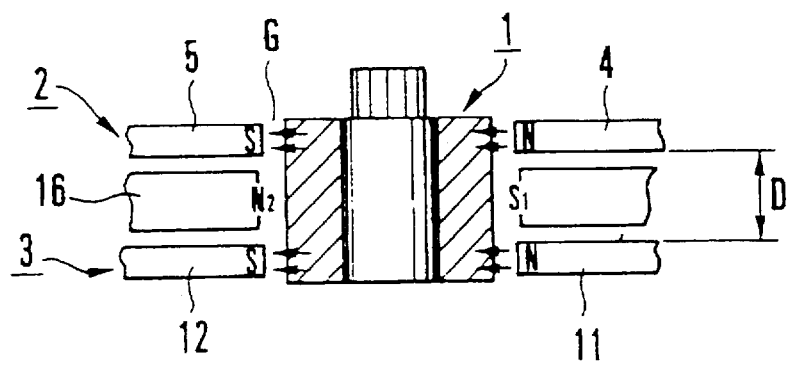
FIG. 12 is a view showing an excitation pattern.
Figure 13:
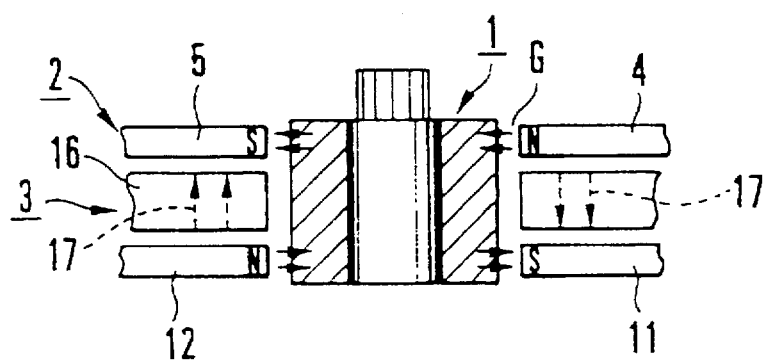
FIG. 13 is a view showing an excitation pattern.
Figure 14:
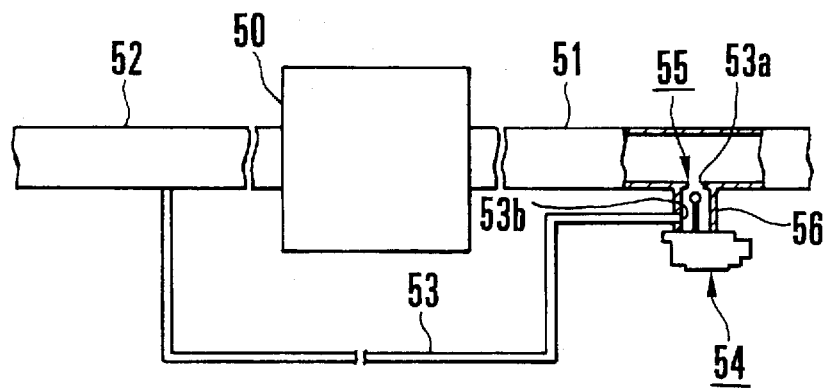
FIG. 14 is a view showing an exhaust gas recirculating system for an automobile engine.

FIG. 9 shows the third embodiment in which the present invention is applied to a geared motor.

A geared motor 150 has a magnet rotor 152, a molded stator body 153, and a rotation transmitting gear train 155. The magnet rotor 152 and the molded stator body 153 are disposed in a motor housing 151. The rotation transmitting gear train 155 is disposed in a gear housing 154 to reduce rotation of the magnet rotor 152.

The magnet rotor 152 mounted on a rotating shaft 156 is formed into a cylindrical shape, and is rotatably inserted in the molded stator body 153 to form a small gap, i.e., a magnetic gap, between its outer circumferential surface and the molded stator body 153.

Stators 161a to 161d are annular stators having the same inner diameter and the same outer diameter. The stators 161a to 161d are concentrically arranged at predetermined gaps from each other in the axial direction of the magnet rotor 152, and is integrally connected with each other with a molded resin 111, thereby constituting the molded stator body 153.

Of the four stators 161a to 161d that are stacked to have axes that coincide with each other, every two adjacent stators, i.e., the stators 161a and 161b, and 161c and 161d respectively are paired, thereby constituting stator assemblies.

The outer circumferential surfaces of the magnetic pole portions of the stators 161a and 161b, and 161c and 161d of the respective pairs, and the surfaces of these stators that oppose each other in the axial direction are covered with resin cover portions 111a. A yoke 166 is mounted on the outer surfaces of excitation coils 165 wound on the outer circumferential surfaces of the magnetic pole portions. This yoke 166 is formed into a U shape in the same manner as the yoke 41 (see FIGS. 6A and 6B) shown in the embodiment described above. The yoke 166 is inserted between the stators 161a and 161b, and 161c and 161d of the respective pairs (see FIG. 7), and is detachably fixed through engagement of engaging portions and recessed portions that are not shown in FIG. 9. The yoke 166 forms a magnetic circuit together with the stators 161a and 161b, and 161c and 161d.

A through hole 163 through which the rotating shaft 156 extends is formed in the center of the upper surface of the molded resin 111, and a bearing 164 is formed on the molded resin 111. The rotating shaft 156 is rotatably, axially supported by a bearing 168 formed on the inner bottom surface of the gear housing 154, and the bearing 164 formed on the molded resin 111 of the molded stator body 153. One end portion of the rotating shaft 156 extends through the through hole 163 of the stator 11 to project into the gear housing 154, and one gear 170 constituting the rotation transmitting gear train 155 is fixed to the projecting end portion of the rotating shaft 156. The rotation transmitting gear train 155 has this gear 170, and gears 173 to 177 for transmitting rotation of the gear 170 to an output shaft 172.

The excitation coils 165 are connected to terminals 167.

With this structure as well, the same effect as that of the embodiment described above can be obtained.

As has been described above, in the stepping motor according to the present invention, four annular stators having the same inner diameter and the same outer diameter are concentrically arranged at predetermined gaps from each other in the axial direction of a magnet rotor such that every two of the four stators are paired. The resultant stators are integrated by molding. Excitation coils are wound on the outer circumferential surfaces of the magnetic pole portions of the stators of the respective pairs. The magnet rotor is rotatably inserted in the stators. A plate-like yoke is formed into a U shape, and is inserted between opposing surfaces of the annular plates adjacent to the outer circumferential surfaces of the annular stators constituting the pairs. Therefore, the outer diameters of the stators can be managed easily. Even if stepped portions are undesirably formed in the outer circumferential surfaces of the stators due to the manufacture error, decentering, shrinkage of the molded resin, and the like, no problem occurs at all. Since the yoke is inserted between the stators of the respective pairs, it can be mounted easily, and the contact area between the section of the yoke and the stators is increased, thereby decreasing variations in magnetic efficiency. Also, the yoke can be brought into tight contact with the excitation coils.

According to the present invention, since the stator assemblies are arranged through the nonmagnetic intermediate plate, the magnetic influence between the stator assemblies corresponding to the respective phases can be suppressed, thereby improving the magnetic efficiency of the respective phases.

Since the engaging portions are formed in the annular stators and the yoke to position the yoke and to engage with each other, the yoke can be reliably fixed at a predetermined position, and magnetic coupling of the yoke and the stators becomes well.

According to the present invention, since the yoke has a slit in which the annular stators of the different pairs that are arranged back to back are to be inserted, the yoke can be mounted on the two stator assemblies with a single operation.

According to the present invention, since the annular stators and other members that are to be connected to the stators are integrally molded, the number of components and the number of assembly steps can be decreased.

According to the present invention, since the terminal holding portion is integrally formed with the stators, a separate terminal holding portion need not be provided at all. Therefore, external wires can be connected easily in one direction, thus facilitating assembly.

According to the present invention, since the bearing portions or bearing holding portions for rotatably, axially supporting the magnet rotor are formed integrally, the number of components and the number of assembly steps can be decreased from this viewpoint as well, thereby improving the assembly operability.

According to the present invention, since the bearing portions each rotatably, axially supporting at least one gear of the rotation transmitting gear train, and the lower or upper case are integrally formed with the stators, the number of components and the number of assembly steps can be further decreased.

What is claimed is:

1. A stepping motor comprising:
    a magnet rotor (1) on which magnetic poles of opposite polarities are alternately, equidistantly arranged in a circumferential direction;
    four annular stators (4, 5, 11, 12) having the same inner diameter and the same outer diameter and concentrically arranged at predetermined gaps in an axial direction of said magnet rotor, every adjacent two of said four annular stators being paired;
    excitation coils (6, 13) respectively wound on the pairs of said annular stators; and
    a U-shaped yoke (41) arranged adjacent to outer circumferential surfaces of said annular stators, wherein each of said annular stators constituting said respective pairs has an annular plate having the inner diameter and a central hole in which said magnet rotor is to be inserted, and pole teeth that form magnetic pole portions separated from said magnet rotor at a predetermined gap, said pole teeth of one annular stator of a given pair extend from said annular plate to be perpendicular to the other annular stator of said given pair, and are equidistantly arranged around said central hole to be shifted from said pole teeth of the other annular stator by a half pitch, an appropriate number of mounting holes are formed in each annular plate at predetermined spaces in the circumferential direction, and said mounting holes formed in said annular plates of said annular stators (5, 11) of different pairs that are arranged back to back are located at the same positions, wherein said four annular stators are assembled into a molded stator body (80) with a non-conductive molding material such that an insulating layer of the molding material is formed on the surfaces that do not oppose said magnet rotor of said annular stators constituting said respective pairs and onto which said excitation coils are wound, said molding material is continuous through said mounting holes formed in said annular plates of said annular stators of said different pairs that are arranged back to back, and said U-shaped yoke is fitted between opposing surfaces of said annular plates of said annular stators (4, 12) that are at opposing ends of said molded stator body, and around approximately one-half of the circumference of said annular stators.

2. A motor according to claim 1, wherein said annular stators (5, 11) of said different pairs that are arranged back to back are arranged through an intermediate plate made of a nonmagnetic material.

3. A motor according to claim 1, wherein said annular stators (4, 5, 11, 12) and said yoke (41) are formed with engaging portions that position said yoke and engage with each other.

4. A motor according to claim 1, wherein said yoke (41) is constituted by an arcuated plate-like body shared by said two pairs, and said plate-like body has a slit in which said annular stators (5, 11) of said different pairs that are arranged back to back are inserted.

5. A motor according to claim 1, wherein said annular stators (4, 5, 11, 12) and other members to be connected thereto are integrally formed by molding.

6. A motor according to claim 5, wherein said other members to be connected to said annular stators (4, 5, 11, 12) include a terminal holding portion for holding a plurality of terminals to which end portions of said excitation coils (6, 13) are connected.

7. A motor according to claim 5, wherein said other members to be connected to said annular stators (4, 5, 11, 12) include a bearing member or a bearing holding member for rotatably, axially supporting said magnet rotor (1).

8. A motor according to claim 5, wherein said other members to be connected to said annular stators (4, 5, 11, 12) include a bearing member for rotatably, axially supporting at least one gear of a rotation transmitting gear train engaging with said magnet rotor (1).

9. A motor according to claim 5, wherein said other members to be connected to said annular stators (4, 5, 11, 12) include a molded stator body and a lower case or an upper case.

* * * * *